United States Patent
Voelker et al.

(10) Patent No.: US 9,363,015 B2
(45) Date of Patent: Jun. 7, 2016

(54) OPTICAL MODULE

(71) Applicant: FINISAR GERMANY GMBH, Berlin (DE)

(72) Inventors: Benjamin Voelker, Teltow (DE); Norbert Ebel, Berlin (DE)

(73) Assignee: FINISAR GERMANY GMBH, Berlin (DE)

( * ) Notice: Subject to any disclaimer, the term of this patent is extended or adjusted under 35 U.S.C. 154(b) by 47 days.

(21) Appl. No.: 14/455,145

(22) Filed: Aug. 8, 2014

(65) Prior Publication Data

US 2016/0043804 A1 Feb. 11, 2016

(51) Int. Cl.
*H04B 10/60* (2013.01)
*H04B 10/2575* (2013.01)

(52) U.S. Cl.
CPC ............ *H04B 10/2575* (2013.01); *H04B 10/60* (2013.01)

(58) Field of Classification Search
CPC .............................. H04B 10/2575; H04B 10/60
USPC .................... 398/137, 201, 213–214
See application file for complete search history.

(56) References Cited

U.S. PATENT DOCUMENTS

| | | | |
|---|---|---|---|
| 6,347,001 B1 * | 2/2002 | Arnold | H04B 10/118 398/122 |
| 7,286,766 B2 * | 10/2007 | Shelton | H04B 10/1127 398/119 |
| 8,391,727 B2 | 3/2013 | Steffan et al. | |
| 2010/0158542 A1 | 6/2010 | Steffan et al. | |

* cited by examiner

*Primary Examiner* — Leslie Pascal
(74) *Attorney, Agent, or Firm* — Maschoff Brennan

(57) ABSTRACT

An embodiment of the invention relates to an optical module comprising at least one optoelectronic component capable of generating or receiving radiation; at least one access port for receiving or emitting the radiation; at least one free-space beam path located between the access port and the optoelectronic component; at least one mirror located in said beam path; at least one attenuation unit located in said beam path; the attenuation unit having a reflecting surface section and an absorbing surface section; and, a control unit for adjusting the amount of radiation which is directed towards the absorbing surface section of the attenuation unit by controlling at least one or all of the following: the position of the mirror, the orientation of the mirror, the position of the attenuation unit and/or the orientation of the attenuation unit.

18 Claims, 4 Drawing Sheets

OPTICAL MODULE

BACKGROUND

1. The Field of the Invention

Embodiments of the invention relate to optical modules and methods of operating optical modules.

2. Background of the Invention

Communication modules, such as electronic or optoelectronic transceivers or transponder modules, are increasingly used in electronic and optoelectronic communication. Such optical modules communicate with a host device printed circuit board by transmitting and/or receiving electrical data signals to and/or from the host device printed circuit board. The electrical data signals may also be transmitted by the optical module outside a host device as optical and/or electrical data signals. Many optical modules include optoelectronic components such as transmitter optical subassemblies and/or receiver optical subassemblies to convert between the electrical and optical domains.

Generally, a receiver optical subassembly converts an optical signal received from an optical fiber or other source to an electrical signal provided to the host device, while a transmitter optical subassembly transforms an electrical signal received from the host device to an optical signal emitted onto an optical fiber or other transmission medium. A photodiode or similar optical receiver contained by the receiver transforms the optical signal to the electrical signal. A laser diode or similar optical transmitter contained within the transmitter is driven to emit an optical signal representing the electrical signal received from the host device.

One difficulty related to optical module design and operation is the ability to control the power level of the optical signal, often referred to as attenuation, particularly within the optical module itself.

SUMMARY

By way of summary, disclosed embodiments are directed to implementations of an optical module that provides the ability to control attenuation of an optical signal inside the module.

For example, one embodiment relates to an optical module that includes one or more optoelectronic components that are capable of generating or receiving radiation, typically in the form of an optical signal. The module includes at least one access port for receiving or emitting the radiation, and at least one free-space beam path located between the access port and the optoelectronic component(s). Disposed within the beam path is at least one mirror and at least one attenuation unit. In one embodiment, the attenuation unit includes a reflecting surface section and an absorbing surface section. Also provided is a control unit. The control unit is configured to adjust the amount of radiation that is directed towards the absorbing surface section of the attenuation unit by controlling at least one or all of the following: the position of the mirror, the orientation of the mirror, the position of the attenuation unit and/or the orientation of the attenuation unit.

Movement of the mirror and/or the attenuation unit by way of the controller allows for attenuation of the radiation (e.g., optical signal) at the module.

In one embodiment, the absorbing surface section of the attenuation unit is at least partially formed by a photodetector.

In one embodiment, the reflecting surface section of the attenuation unit may be located adjacent to or surrounded by the absorbing surface section of the attenuation unit. In some embodiments, the reflecting surface section is located on the active surface of the photodetector.

In one embodiment, the mirror and the attenuation unit may be separated by a beam path section of the free-space beam path. In this embodiment, the attenuation unit can be positioned for receiving reflected radiation from the mirror.

In one embodiment, the mirror may be a tiltable mirror. In this case, the control unit can be configured to control the angle of the tiltable mirror.

In one embodiment, the photodetector provides the control unit with a signal that indicates the amount of radiation being detected. The control unit may be connected to the photodetector and configured to evaluate the signal provided by the photodetector and to control the position and/or orientation of the mirror and/or the position and/or orientation of the attenuation unit as a function of the photodetector's signal.

In an embodiment, the beam path comprises a first beam path section, a second beam path section and a third beam path section. The second beam path section can be angled with respect to the first and third beam path sections to connect the first and third beam path sections, and the angle of the second beam path section can be controlled by the control unit.

In an example embodiment, the tiltable mirror may be located at one end of the second beam path section and may connect the first and second beam path sections. The attenuation unit may be located at the other end of the second beam path section and connect the second and third beam path sections.

The access port can include a lens configured to couple the radiation between the free-space beam path and the end face of an optical component, such as an external optical fiber or an external waveguide, which is connected with the access port.

Optionally, the optical module may further include a beam combiner that is located between the optoelectronic component and the beam path. In this embodiment, the beam combiner is configured to combine at least two radiation signals in order to provide a combined radiation beam that enters the beam path.

In yet another embodiment, an optical module that includes at least one optoelectronic component capable of generating or receiving radiation, such as an optical signal, and at least one access port for receiving or emitting the radiation, is disclosed. The optical module includes at least one free-space beam path that is located between the access port and the optoelectronic component. In addition, at least one mirror and at least one attenuation unit is located in the beam path. In a disclosed embodiment, the attenuation unit includes a reflecting surface section and an absorbing surface section. The amount of radiation that is directed towards the absorbing surface section of the attenuation unit is adjusted by controlling at least one or all of the following: the position of the mirror, the orientation of the mirror, the position of the attenuation unit and/or the orientation of the attenuation unit.

The absorbing surface section of the attenuation unit, or at least a part of it, can be formed by a photodetector so that the photodetector provides a signal that indicates the amount of radiation being detected.

In one embodiment, the signal provided by the photodetector is evaluated to control at least one or all of the following so as to achieve a desired attenuation of the radiation/optical signal: the position of the mirror, the orientation of the mirror, the position of the attenuation unit and/or the orientation of the attenuation unit.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood a more particular description of the invention, briefly summarized above, will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
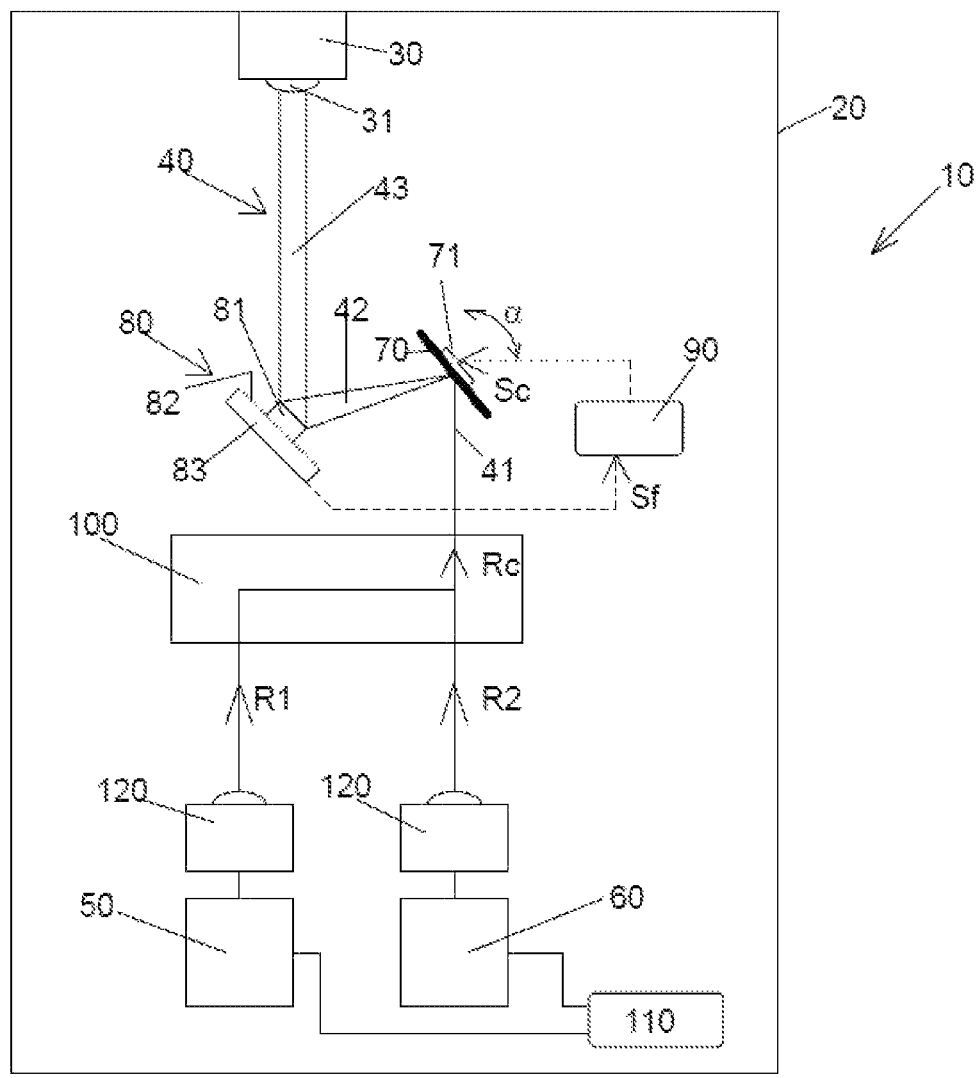
FIG. 1 shows a first exemplary embodiment of an optical module wherein the angle of a tiltable mirror leads to a minimal attenuation in a free-space beam path.

In the following detailed description reference is made to the accompanying drawings that show, by way of illustration, exemplary embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of exemplary embodiments of the invention.

FIG. 1 shows a first embodiment of an optical module, generally designated at 10, which comprises a housing 20 and at least one access port 30. In this example, the access port 30 comprises a lens 31 that couples radiation, such as an optical signal, between a free-space beam path, denoted generally at 40, and the end face of an external optical component. The external optical component is not depicted in FIG. 1 for the purpose of clarity, but may include an external optical fiber or an external waveguide, or any other suitable component that is operably connected with the access port 30.

In the illustrated embodiment, the optical module 10 also includes one or more optoelectronic components that are capable of generating and/or receiving radiation. For instance, the optical module 10 may form an optoelectronic transceiver. In exemplary fashion, FIG. 1 shows two optoelectronic components 50 and 60 that are capable of generating radiation, such as lasers. The module 10 may comprise further optoelectronic components such as receivers, such as photodetectors, which are not depicted for the purpose of clarity.

In the example of FIG. 1, a tiltable mirror 70 and an attenuation unit 80 are located in the beam path 40 such that the beam path is segmented into a first beam path section 41, a second beam path section 42, and a third beam path section 43.

As is shown here, the tiltable mirror 70 is located at one end of the first beam path section 41 and at one end of the second beam path section 42 and thus connects the first and second beam path sections 41 and 42.

In the illustrated example, the attenuation unit 80 is located at the other end of the second beam path section 42 and at one end of the third beam path section 43 and thus connects the second and third beam path sections 42 and 43.

In this embodiment, the tiltable mirror 70 and the attenuation unit 80 are arranged and oriented to allow the second beam path section 42 to be angled with respect to the first and third beam path sections 41, 43.

As is shown, the tiltable mirror 70 can be controlled by a control unit 90, which is configured to control the orientation or angle, denoted as α, of the tiltable mirror 70 and therefore the angle of the second beam path, section 42. To this end, the tiltable mirror comprises a mechanism 71 that can be controlled by a control signal Sc provided by the control unit 90. The mechanism 71 may include any sort of adjusting device, and in one embodiment a micro-electromechanical system (MEMS) is used.

In the illustrated embodiment, the attenuation unit 80 comprises a reflecting surface section 81 and an absorbing surface section 82. In this example, the reflecting surface section 81 of the attenuation unit 80 is located adjacent to, or is surrounded by, the absorbing surface section 82 of the attenuation unit 80.

The amount of radiation that is directed towards the absorbing surface section 82, and the amount of radiation that is directed towards the reflecting surface section 81, of the attenuation unit, depend on the angle α of the mirror 70 and thus the angle of the second beam path section 42 and can therefore be controlled by the control unit 90. To this end, the control unit 90 simply changes the orientation or angle α of the tiltable mirror 70.

In the embodiment shown in FIG. 1, the absorbing surface section 82 of the attenuation unit 80, or at least a part of it, is formed by a photodetector 83. In this case the reflecting surface section 81 of the attenuation unit 80 may be located on the active surface of the photodetector 83. The reflecting surface section 81 may be formed by a mirror that is located on the active surface of the photodetector 83 and which focuses radiation on the lens 31 of the access port 30. Depending on the needs of an application, the mirror can be flat or concave in shape.

As is shown in the embodiment of FIG. 1, in order to provide a feedback signal (photodetector signal) Sf to the control unit 90, the photodetector 83 is operably connected to the control unit 90. The feedback signal Sf indicates the amount of radiation which falls on the photodetector 83 and the absorbing surface section 82. The feedback signal Sf enables the control unit 90 to achieve a given attenuation in the beam path 40. To this end, the control unit is configured to evaluate the feedback signal Sf provided by the photodetector 83 and to control the orientation of the tiltable mirror 70 accordingly.

In the illustrated embodiment, the optical module 10 also includes a beam combiner 100 that is located between the optoelectronic components 50 and 60 and the tiltable mirror 70. The beam combiner 100 is configured to combine radiation signals R1 and R2 generated by the optoelectronic components 50 and 60 in order to provide a combined radiation beam Rc that enters the beam path 40. In one embodiment, the radiation signals R1 and R2 may be introduced into the beam combiner 100 by way of lens units 120.

In an example embodiment, the optical module 10 may be operated in the following manner.

The optoelectronic components 50 and 60, which may be controlled and operated by a driver unit 110, generate the radiation signals R1 and R2. The radiation signals R1 and R2 enter the beam combiner 100, which outputs the combined radiation beam Rc. The radiation beam Rc enters the beam path 40, passes the first beam path section 41 and reaches the tiltable mirror 70.

As is shown in FIG. 1, the tiltable mirror 70 can be adjusted by the control unit 70 in a way that substantially the entire radiation in the second beam path section, i.e. the entire radiation beam Rc, falls on the reflecting surface section 81 of the attenuation unit 80. The reflecting surface section 81 reflects the radiation towards the lens 31 of the access port 30. As such, the attenuation of the beam path 40 is minimized.

In order to ensure that the entire radiation beam Rc reaches the reflecting surface section 81 of the attenuation unit 80, the control unit evaluates the feedback signal Sf of the photodetector 83, for instance the amplitude of the feedback signal Sf, and chooses an angle α for which the feedback signal Sf indicates a minimal reception of Rc at the photodetector surface 83 (and thus maximal reception as the reflecting surface 81).

Figure 2:
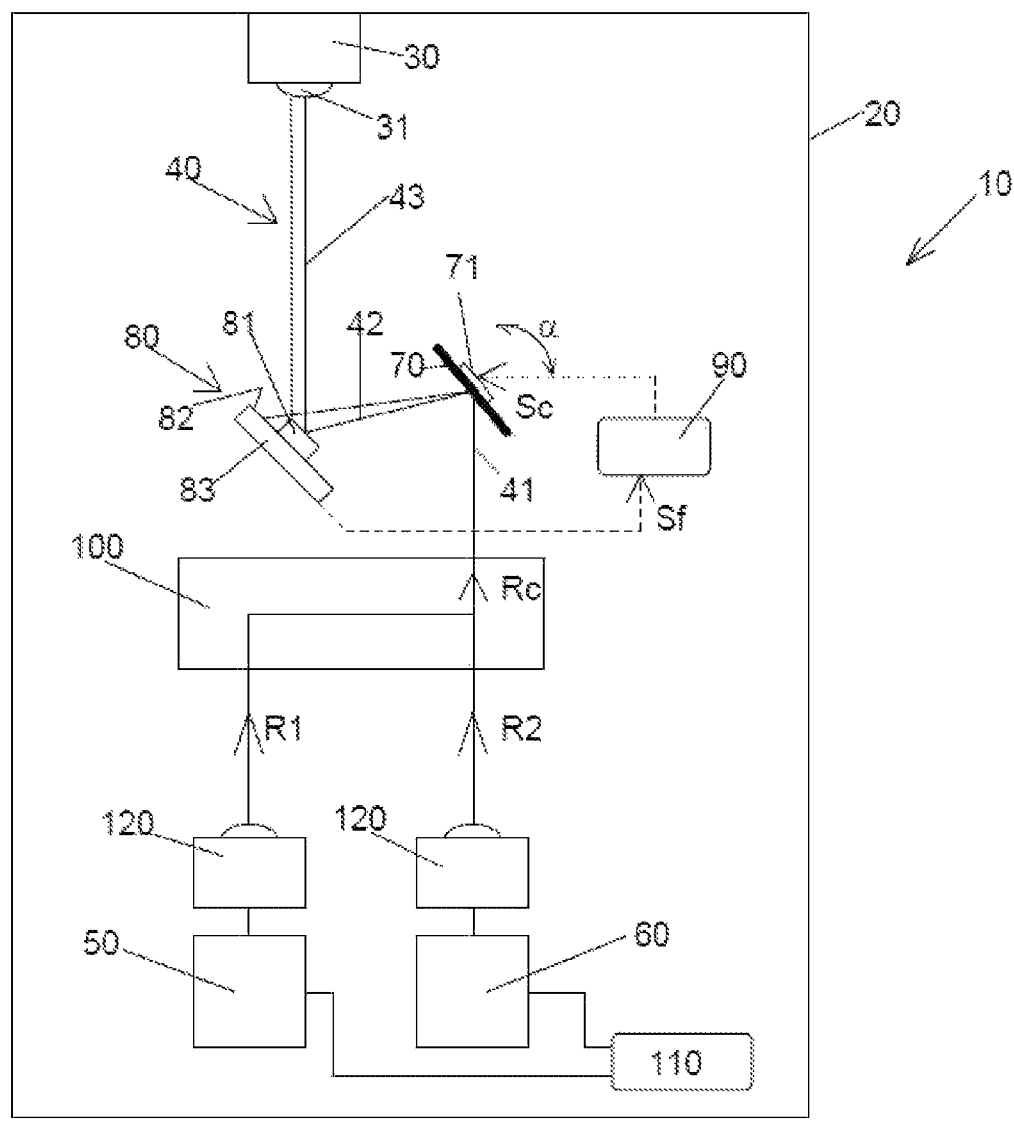
FIG. 2 shows the first exemplary embodiment according to FIG. 1 wherein the angle of the tiltable mirror leads to an increased attenuation in the free-space beam path.

Referring next to FIG. 2, the example embodiment illustrates how the tiltable mirror 70 can be adjusted differently compared to FIG. 1. In FIG. 2, the tiltable mirror 70 is tilted such that a first portion of the radiation in the second beam path section 42 falls on the reflecting surface 81, and a second portion of the radiation in the second beam path section 42 falls on the photodetector 83. The photodetector 83 absorbs this second portion and provides a feedback signal Sf that differs from the feedback signal Sf in FIG. 1, indicating that less of the signal is received at the reflecting surface 81 and, in effect, resulting in an attenuated signal.

In order to ensure that attenuation in the beam path 40 has a given magnitude, the control unit evaluates the feedback signal Sf of the photodetector 83 and chooses an angle α for which the feedback signal Sf indicates the appropriate reception and absorption.

Figure 3:
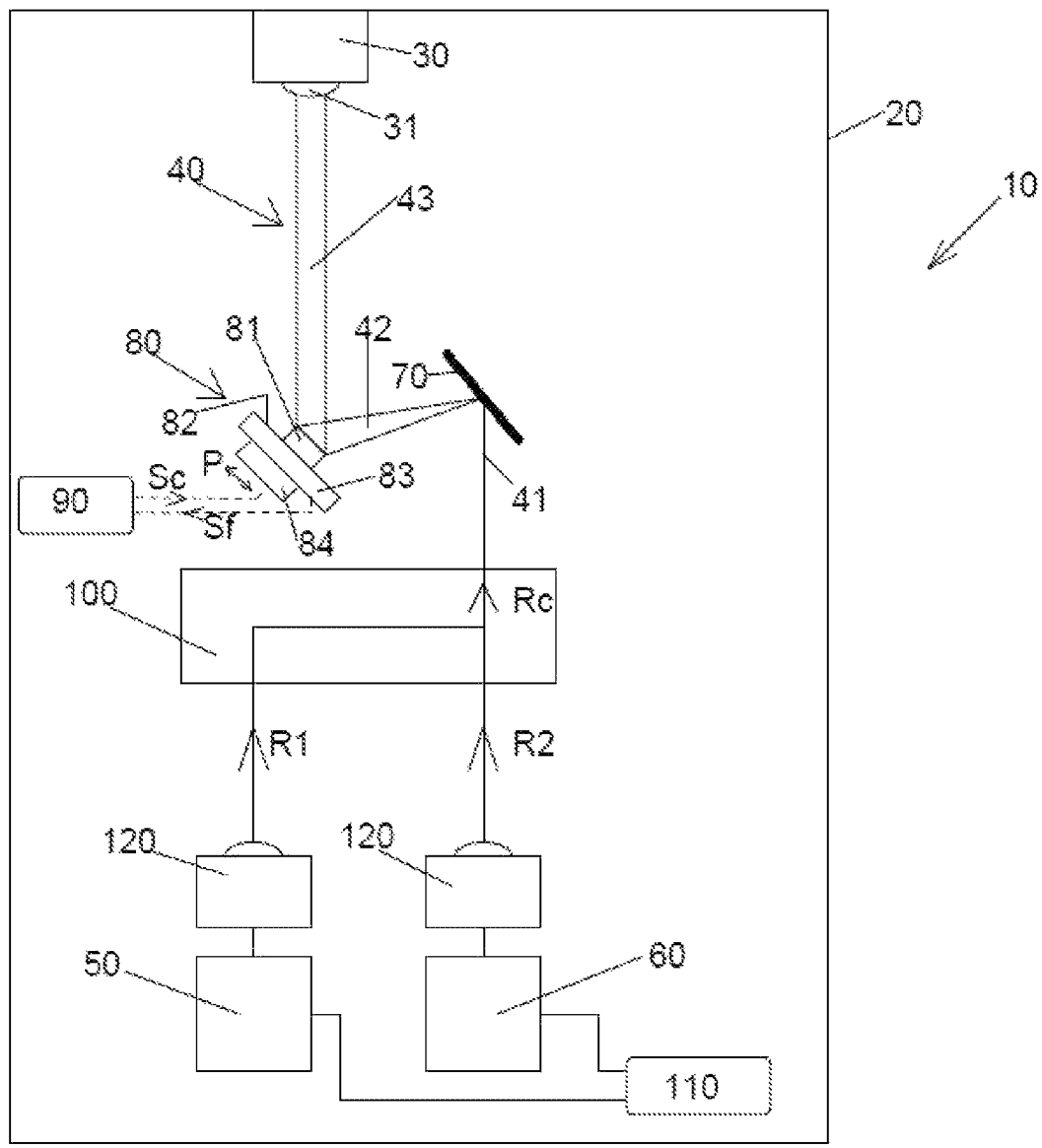
FIG. 3 shows a second exemplary embodiment of an optical module wherein the position of an attenuation unit leads to a minimal attenuation in a free-space beam path.

Reference is next made to FIG. 3, which shows another embodiment of an optical module 10. In this embodiment, the module 10 includes a housing 20 and at least one access port 30. The module 10 of FIG. 3 resembles the first embodiment according to FIGS. 1 and 2, except the module 10 of FIG. 3 comprises a fixed mirror 70 and a movable attenuation unit 80. In this particular embodiment, the movable attenuation unit 80 comprises a mechanism 84 that is capable of moving the photodetector 83 and the reflecting surface section 81. In this particular illustration, the movement is longitudinal along the direction indicated by arrow P.

In the example of FIG. 3 the movable attenuation unit 80 can be adjusted by the control unit 70 in a way such that substantially the entire radiation in the second beam path section 42, i.e. the entire radiation beam Rc, falls on the reflecting surface section 81 of the attenuation unit 80. In this mode, the reflecting surface section 81 reflects the radiation towards the lens 31 of the access port 30. As such, the attenuation of the beam path 40 is minimal.

In order to ensure that substantially the entire radiation beam Rc reaches the reflecting surface section 81 of the attenuation unit 80, the control unit evaluates the feedback signal Sf of the photodetector 83, for instance, the amplitude of the feedback signal Sf, and chooses a position of the movable attenuation unit 80 for which the feedback signal Sf indicates a minimal reception at the photodetector surface 83 (and thus maximal reception as the reflecting surface 81).

Figure 4:
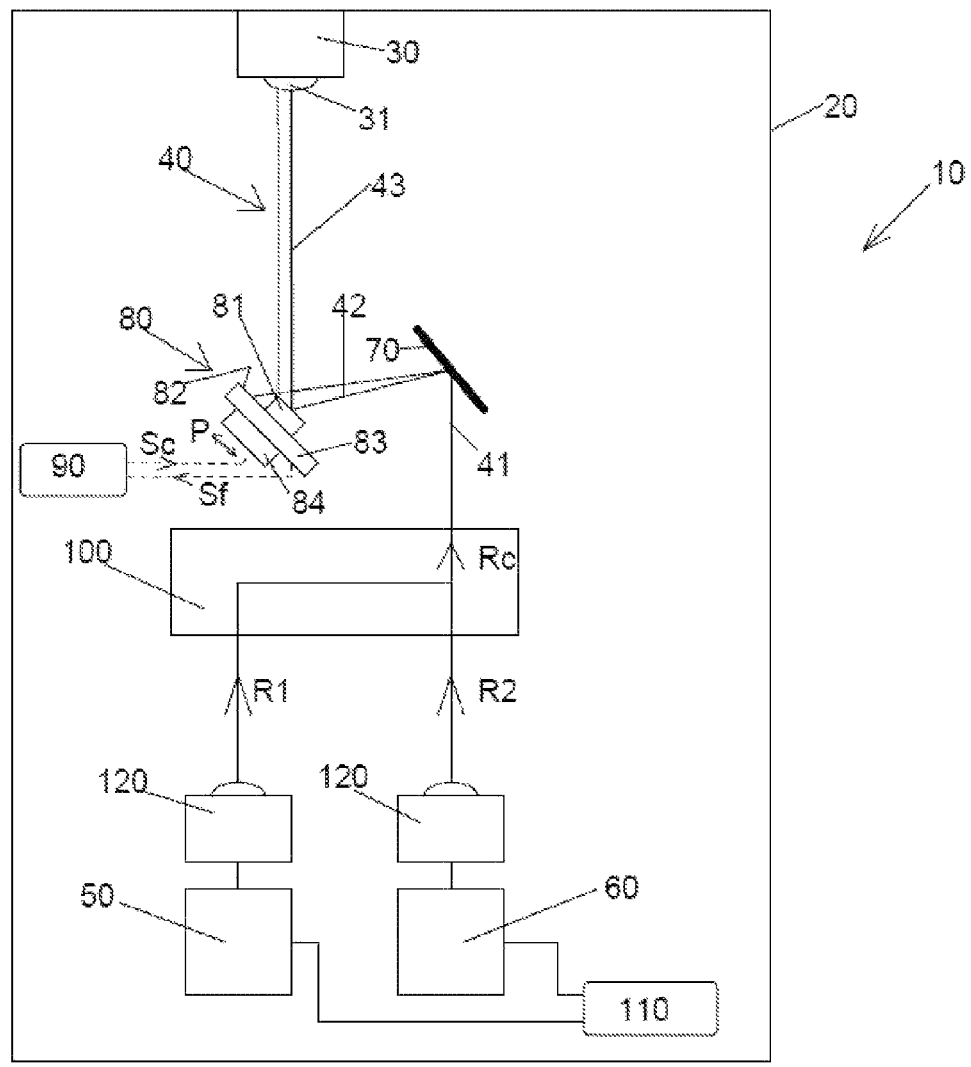
FIG. 4 shows the second exemplary embodiment according to FIG. 3 wherein the position of the attenuation unit leads to an increased attenuation in the free-space beam path.

In the example embodiment of FIG. 4 the movable attenuation unit 80 is positioned differently compared to FIG. 3. In FIG. 4 the movable attenuation unit 80 is slightly shifted away—along the direction indicated by arrow P—such that a first portion of the radiation in the second beam path section 42 falls on the reflecting surface 81 and a second portion of the radiation in the second beam path section 42 falls on the photodetector 83. The photodetector 83 absorbs this second portion and provides a feedback signal Sf which differs from the feedback signal Sf in FIG. 3.

In order to ensure that attenuation in the beam path 40 has a given magnitude, the control unit 90 evaluates the feedback signal Sf of the photodetector 83 and chooses a position for which the feedback signal Sf indicates the appropriate reception (and thus attenuation).

From the explanations provided above it should be apparent that the control unit 90 may—alternatively or additionally—be configured to adjust the amount of radiation which is directed towards the absorbing surface section 82 of the attenuation unit 80 by controlling the position of the mirror 70 and/or the orientation of the attenuation unit 90.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical module comprising:
    at least one optoelectronic component capable of generating or receiving radiation;
    at least one access port configured to receive or emit the radiation;
    at least one free-space beam path located between the access port and the optoelectronic component;
    at least one mirror located in said beam path;
    at least one attenuation unit located in said beam path, the attenuation unit having a reflecting surface section and an absorbing surface section; and
    a control unit configured to adjust the amount of radiation which is directed towards the absorbing surface section of the attenuation unit by controlling at least one of the following: the position of the mirror, the orientation of the mirror, the position of the attenuation unit and the orientation of the attenuation unit.

2. The optical module according to claim 1, wherein at least a portion of the absorbing surface section is formed by a photodetector.

3. The optical module of claim 2, wherein the reflecting surface section is located on an active surface of the photodetector.

4. The optical module of claim 2, wherein the photodetector provides the control unit with a signal that indicates the amount of radiation being detected at the photodetector.

5. The optical module of claim 4, wherein the control unit is connected to the photodetector and configured to evaluate the signal provided by the photodetector and to control the position and/or orientation of the mirror and/or the position and/or orientation of the attenuation unit as a function of the amount of radiation detected.

6. The optical module of claim 1, wherein the reflecting surface section is located adjacent to or surrounded by the absorbing surface section.

7. The optical module of claim 1, wherein the mirror and the attenuation unit are separated by a beam path section of the free-space beam path, and the attenuation unit is positioned in a manner so as to receive reflected radiation from the mirror.

8. The optical module of claim 1, wherein the mirror is configured so as to be oriented at an angle ($\alpha$) and the control unit is configured to control the angle ($\alpha$).

9. The optical module of claim 1, wherein:
the beam path comprises a first beam path section, a second beam path section, and a third beam path section,
wherein the second beam path section is angled with respect to the first and third beam path sections and connects the first and third beam path sections, the angle of the second beam path section being controlled by the control unit.

10. The optical module of claim 9 wherein:
the mirror is located at one end of the second beam path section and connects the first and second beam path sections, and
the attenuation unit is located at the other end of the second beam path section and connects the second and third beam path sections.

11. The optical module of claim 1, wherein the access port comprises a lens configured to couple the radiation between the free-space beam path and an end face of an external optical component.

12. The optical module of claim 1, further comprising a beam combiner located between the optoelectronic component and the beam path, the beam combiner configured to combine at least two radiation signals in order to provide a combined radiation beam that enters the beam path.

13. An optical module comprising:
at least one optoelectronic component capable of generating or receiving radiation;
at least one access port configured to receive or emit the radiation;
at least one free-space beam path located between the access port and the optoelectronic component;
at least one mirror located in said beam path;
at least one attenuation unit located in said beam path, the attenuation unit having a reflecting surface section and an absorbing surface section; and
a control unit configured to adjust the amount of radiation which is directed towards the absorbing surface section of the attenuation unit by controlling the position of the mirror.

14. The optical module according to claim 13, wherein at least a portion of the absorbing surface section is formed by a photodetector, wherein the photodetector provides the control unit with a signal that indicates the amount of radiation being detected at the photodetector.

15. The optical module of claim 14, wherein the control unit is connected to the photodetector and configured to evaluate the signal provided by the photodetector and to control the position of the mirror as a function of the amount of radiation detected.

16. An optical module comprising:
at least one optoelectronic component capable of generating or receiving radiation;
at least one access port configured to receive or emit the radiation;
at least one free-space beam path located between the access port and the optoelectronic component;
at least one mirror located in said beam path;
at least one attenuation unit located in said beam path, the attenuation unit having a reflecting surface section and an absorbing surface section; and
a control unit configured to adjust the amount of radiation which is directed towards the absorbing surface section of the attenuation unit by controlling the orientation of the mirror.

17. The optical module according to claim 16, wherein at least a portion of the absorbing surface section is formed by a photodetector, wherein the photodetector provides the control unit with a signal that indicates the amount of radiation being detected at the photodetector.

18. The optical module of claim 17, wherein the control unit is connected to the photodetector and configured to evaluate the signal provided by the photodetector and to control the orientation of the mirror as a function of the amount of radiation detected.

* * * * *